March 27, 1934.     J. B. EDMONDS     1,952,977
METHOD OF TREATING RED SQUILL FOR USE AS A RODENT EXTERMINATOR
Filed May 29, 1931
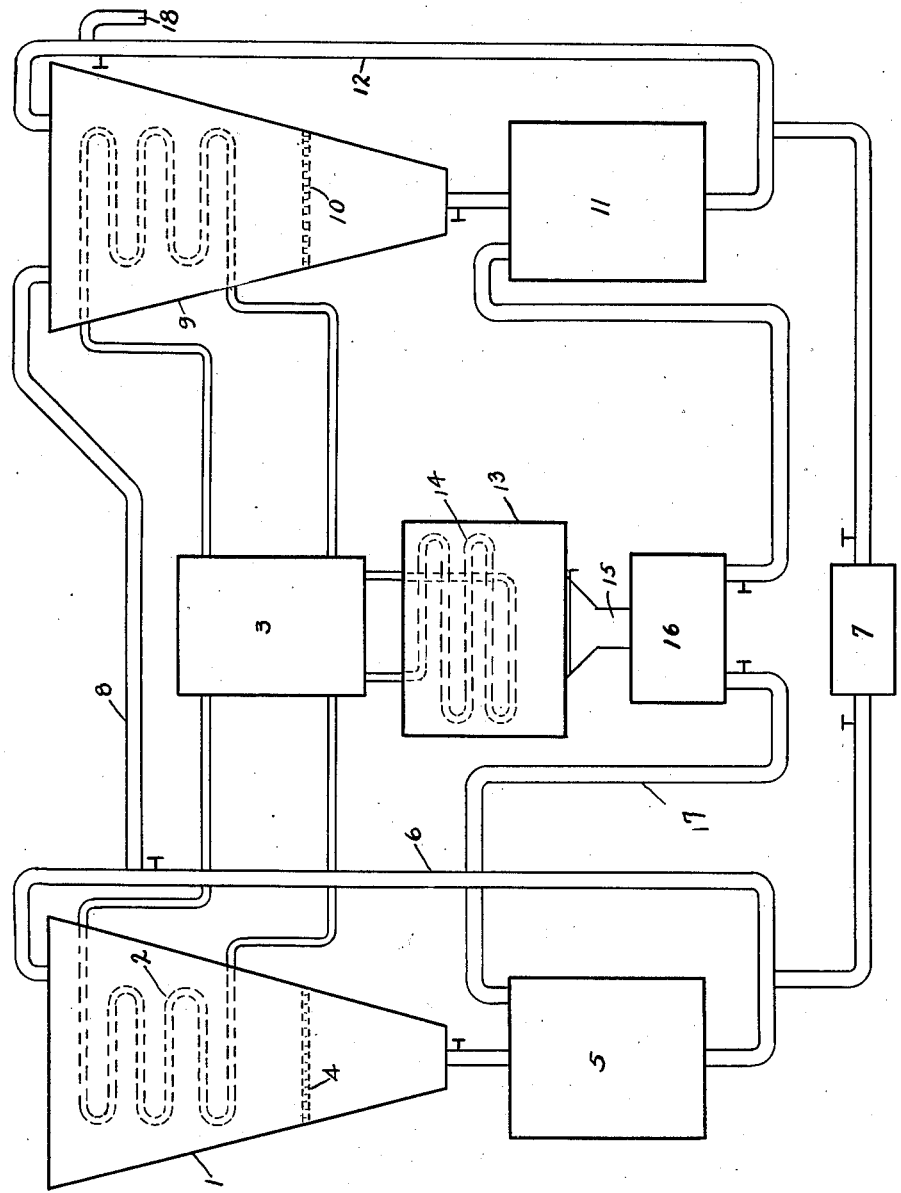
Inventor
J. BERNARD EDMONDS Patented Mar. 27, 1934

1,952,977

UNITED STATES PATENT OFFICE 1,952,977

METHOD OF TREATING RED SQUILL FOR USE AS A RODENT EXTERMINATOR

Joseph Bernard Edmonds, Baltimore, Md.

Application May 29, 1931, Serial No. 541,071

5 Claims. (Cl. 167—46)

The present invention consists of a method of extracting the toxic principle from red squill for use as a rodent exterminator, and a rodent exterminator compound having for an object the use of red squill as an active ingredient in the compound, to positively exterminate rodents consuming the same.

The use of red squill is well-known in this art to exterminate rodents, its use being desirable because of the deadly effect of the red squill on rodents when consumed in proper proportions, it of course, being well-known that red squill is not deadly to animals in that it cannot be retained by them. The principal difficulty in the use of red squill is that the toxicity of the latter is of wide range, due to various conditions in the growing, harvesting and drying of the red squill bulbs. The minimum lethal dose is based on the weight of the squill eaten per kilo body weight of the rodent. Consequently, unless the minimum amount is consumed, the lethal effect of red squill is negative. Where, however a lethal dose is consumed, respiratory paralysis takes place and the rodent seeks the open air, which is a further advantage of the use of red squill as a rodent exterminator. The variation in toxicity of red squill is particularly emphasized in extracts of the latter, as the general methods of extraction are frequently insufficient to take care of the low toxic principle contained in the red squill bulbs. The result is that it is difficult to obtain a uniformly toxic preparation of liquid red squill and consequently, use of so-called red squill extracts as an exterminator for rodents has proven a failure. I have found by following the teaching of the present invention, herein outlined, that the active toxic principle of red squill can be uniformly extracted in a continuous and simple manner. This permits the association of the compound with other ingredients, giving off an aroma to attract the rodent, together with an edible and/or sweetening ingredient to positively attract rodents to the bait to which the compound has been applied and to insure consumption thereof by the rodent, with deadly effect.

A further object of the invention is to provide a method for positively extracting the active toxic principle uniformly from red squill by use of a counter-current of the squill to an acidulated aqueous solution at a predetermined temperature.

In order to illustrate the steps in the method of the present invention, I have in the accompanying drawing shown apparatus which may be used for this purpose, in which The figure is a diagrammatic view of mechanism employed for carrying out the method forming a part of the present invention.

This invention contemplates the use of granular red squill, the selection of which is based on microscopic and biological analysis, preferably sized or milled 8—14 mesh, together with bacteria-free water, ninety-nine percent (99%) chemically pure glacial acetic acid, and sodium benzoate.

Preferably six (6) pounds of granular red squill mingled with one hundred twenty-five (125) pounds of water, to which has been added four (4) ounces of acetic acid and one (1) ounce of sodium benzoate, is deposited in vat 1, and heated through the medium of a steam coil 2, issuing from a steam boiler 3, to the temperature of from 200° F. to 210° F. The red squill is held suspended from the bottom of vat 1 by a screen or perforated plate 4, permitting the liquid in vat 1 to pass uninterruptedly through the bottom of the vat and into a receiving tank 5. The liquid received in tank 5 is permitted to gravitate into a pipe or conduit 6 and is forced upwardly through the latter for reentry into the vat 1 through the medium of a pump 7. This circulation, at the temperature specified, is continued for a period of two (2) hours, the liquid solution passing through the mechanically suspended squill at the rate of one-half gallon per minute. At the expiration of two hours the circulation is stopped and the entire patch confined in vat 1 for a period of approximately twelve (12) hours. At the end of twelve hours, the liquid is permitted to gravitate into tank 5 and into the circulating pipe 6, through which it is pumped into a by-pass 8, one end of the latter being in communication with the pipe 6 and the other end entering into a vat 9. The vat 9 is identical in construction to the vat 1 and is also equipped with a screen or perforated plate designated 10, which is adapted to mechanically suspend a fresh supply of red squill. Approximately six (6) pounds of granular red squill is placed on the screen 10 of vat 9, and the liquid from vat 1 pumped thereon. At this time fifteen percent (15%) more water is added, with one (1) ounce of sodium benzoate. The liquid gravitates from vat 9 into tank 11 and from the latter is pumped through pipe or conduit 12, back into the vat 9. This circulation continues for a period of two (2) hours, at a temperature of from 200° F. to 210° F., the vat 9 being heated by a steam coil in the same manner as vat 1. The circulation is then stopped and the entire batch permitted to remain at a normal temperature in vat 9, for a period of approximately twenty-four (24) hours. After this period of extraction the liquor is drawn off through the outlet spout 18. It is now a highly concentrated extract of less volume and is adapted to be mixed with the subsequent charges.

The above-described operation starts the cycles of treatment of the red squill, following which the spent squill is removed from vat 1 and may be boiled in a receptacle 13, heated by coils 14, which are in communication with the boiler 3. The squill is adapted to be boiled with one hundred twenty-five (125) pounds of water, which contains four (4) ounces of acetic acid and one (1) ounce of sodium benzoate. The mixture, while still hot, is permitted to pass through the bottom of the receptacle 13 into a valved chute 15 and thence into a press 16. The last trace of the toxic principle is now removed from the squill and the liquid expressed from the latter is transferred into tank 5, through the pipe 17 and from the tank is pumped into vat 1, in an apparent manner. The vat 1 has now been replenished with a new supply of red squill, preferably about six (6) pounds. The liquid from vat 1 is then passed through the squill at the rate of one-half gallon a minute for a period of two (2) hours, at a temperature of 200° F. to 210° F. The circulation is then cut off and the mixture permitted to stand for a period of twelve hours, following which it is boiled with the spent squill from vat 9 and the same operation repeated as that set out above, for the treatment of the spent squill removed from vat 1. The liquid is then pumped into vat 9 which has been likewise replenished with six (6) pounds of granular squill and fifteen percent (15%) more water is added, containing one (1) ounce of sodium benzoate and the solution then circulated through the fresh squill in vat 9, in a manner already herein described, for a period of two hours. At the expiration of this time the solution, with the spent squill immersed therein, is permitted to stand in vat 9 for a period of twenty-four hours and the finished extract may be then drawn off through the outlet spout 18, communicating with pipe 12. The volume or weight of the finished extract is equivalent to the amount of the original water added, namely, one hundred twenty-five pounds, as fifteen percent (15%) has been added to vat 9 before circulation in order to take care of evaporation and the amount remaining in the spent squill.

The extract obtained by the above process is sterilized, to prevent deterioration after bottling and is mixed with suitable ingredients to make the commercial product edible and to give off an aroma which will entice the rodents. I have found that good results are obtained by adding to every gallon of the liquid red squill extract, one (1) ounce of soluble saccharin to make the product edible and approximately one tenth of one percent (0.1%) of oil of anise to give off an aroma through the medium of which the rodents are attracted. It is of course, understood that saccharin and oil of anise are old in this art and it is likewise understood that other ingredients may be substituted therefor. However, these ingredients mingled with the red squill extract in the proportions set out have been found to be effective in commercial use. In mingling the saccharin and oil of anise with the red squill extract, I have found the following method to be preferable.

After the saccharin has been mixed with the red squill extract it is heated to a temperature of from 150° F. to 180° F. and the bottles or packages in which the liquid is to be contained are sterilized. While the liquid is still hot the oil of anise is added and the liquid immediately poured into the hot sterilized bottles or other packages in which the commercial exterminator is to be vended. When the extract is packaged in this manner, neither heat nor cold affects the potency of the same.

In use, one (1) part of the extract is diluted in two (2) parts of water and preferably applied to dry bread, toast or some other absorbent material which may be consumed by the rodents.

I also have found that the spent squill, after all the juices have been extracted therefrom, may be treated for use as an exterminator for mice. The spent squill is treated by mixing one (1) part molasses and one (1) part of the red squill extract, after which the squill is permitted to dry slowly to evaporate the liquid. The squill is finally dried in an oven at a temperature of 100° C., until it takes the appearance of seeds. Each of these seeds or particles of the spent squill will be found to be enveloped in a film of the poison, and will be eaten by the mice. The seeds treated in this manner contain sufficient toxicity to kill mice.

It is to be understood that although I have described a particular method which I have found, after extensive research, to uniformly extract the toxic principle from red squill, I am nevertheless aware that this method may be varied within the teaching of the present invention and substantially the same results obtained. I am moreover, aware that the association of the extract with an edible ingredient, and an ingredient for attracting the rodent, is important in the present invention only because of the particular method of mingling the extract with these ingredients. Various other changes may be made in the invention within the scope of the claims hereto appended.

What is claimed is:

1. A rodent exterminator, including extract of red squill, oil of anise and saccharin.

2. A rodent exterminator compound, including red squill, water, acetic acid and sodium benzoate.

3. A rodent exterminator including extract of red squill, an essential oil and a sweetening agent.

4. A rodent exterminator compound including red squill water, an extracting agent and a preservative.

5. A rodent exterminator, including an extract of red squill.

JOSEPH BERNARD EDMONDS.